(12) United States Patent
Gao et al.

(10) Patent No.: US 12,007,323 B2
(45) Date of Patent: *Jun. 11, 2024

(54) COMPACT APPARATUS FOR HIGH-SPEED CHEMICAL SPECTRAL SIGNATURE MEASUREMENT AND METHOD OF USING SAME

(71) Applicant: EPIR, Inc., Bolingbrook, IL (US)

(72) Inventors: Wei Gao, Charlotte, NC (US); Chang Yong, Naperville, IL (US); Silviu Velicu, Darien, IL (US); Sivalingam Sivananthan, Naperville, IL (US)

(73) Assignee: EPIR, INC., Bolingbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,721

(22) Filed: Nov. 21, 2022

(65) Prior Publication Data

US 2023/0228675 A1    Jul. 20, 2023

Related U.S. Application Data

(63) Continuation of application No. 16/699,552, filed on Nov. 29, 2019, now Pat. No. 11,506,598.

(51) Int. Cl.
*G01J 3/10*    (2006.01)
*G01J 3/12*    (2006.01)
*G01N 21/25*   (2006.01)
*G01N 21/35*   (2014.01)

(52) U.S. Cl.
CPC ............ *G01N 21/255* (2013.01); *G01J 3/108* (2013.01); *G01J 3/1256* (2013.01); *G01N 21/35* (2013.01)

(58) Field of Classification Search
CPC ........ G01J 3/02; G01J 3/26; G01J 3/12; G01J 3/108; G01J 3/1256; G01N 21/255; G01N 21/35
See application file for complete search history.

(56) References Cited

U.S. PATENT DOCUMENTS 11,506,598 B2 * 11/2022 Gao ..................... G01N 21/255

* cited by examiner

*Primary Examiner* — Abdullahi Nur
(74) *Attorney, Agent, or Firm* — Erickson Law Group, PC

(57) ABSTRACT

A multiband IR adjunct (MIRA) sensor to spectroscopically determine the content and the concentration of chemical composition of a targeted object, includes a sensor housing, a first front optics in a first optical channel, a second front optics in the first optical channel, an acousto-optic tunable filter (AOTF), a photo detector (PD), a set of back optics in the first optical channel that focuses polarized narrow-band light beams received from the AOTF device onto the PD, the PD converting the polarized narrow-band light beams into an electrical signal, and a data acquisition unit signal-connected to the PD, the data acquisition unit collecting the electrical signals. Multiple optical channels can be provided within the housing to analyze UV/VIS/near infrared (NIR), short-wavelength infrared (SWIR), mid-wavelength infrared (MWIR), and LWIR wavelength ranges respectively.

19 Claims, 4 Drawing Sheets

COMPACT APPARATUS FOR HIGH-SPEED CHEMICAL SPECTRAL SIGNATURE MEASUREMENT AND METHOD OF USING SAME

This application is a continuation of U.S. Ser. No. 16/699,552, filed Nov. 29, 2019.

BACKGROUND OF THE INVENTION

Spectroscopy, primarily in the electromagnetic spectrum, is a fundamental exploratory tool in the fields of physics, chemistry, and astronomy, allowing the composition, physical structure and electronic structure of matter to be investigated at atomic scale, molecular scale, macro scale, and even over astronomical distances. In addition to the spectroscopy in ultraviolet (UV) and visible (VIS) ranges that is a much more mature technology, infrared (IR) emission and absorption spectroscopies are growing technologies and gaining acceptance in variety of civilian and military applications.

Signature IR emissions, when excited molecules release photons and returns to their ground states, are correspondent to the bonding in the molecular structure of the matter and are often unique to the chemical composition of the substance. The strength of the IR emission peak, on the other hand, depends on the concentration of the substance. Therefore, the IR emission spectrum can be used to identify the chemical composition as well as to estimate the concentration of the chemical in a targeted object.

However, since a strong IR emission requires exciting energy and is often accompanied by stronger emissions in the UV and VIS ranges due to the high temperature or high energy plasma involved, the signal-to-noise ratio (SNR) of IR emission spectroscopy is often low rendering difficulties in using it as the sole source of information in the substance identification process. Instead, the emissions in the UV and VIS ranges from the same source material are much stronger and are often used in spectroscopic analysis. An alternative method of measuring IR emission is to use filters to filter out UV and VIS emission from the same source, and, therefore, increase the SNR significantly.

When the targeted substance does not emit IR light, for example at room temperature and not excited by an external energy source, the absorption spectroscopy can be used to identify the content and the concentration of the substance. In this circumstance, the amount of IR light from a light source, either an external IR light source, or the background blackbody radiation, transmitted through a targeted substance, in either a gaseous, or a liquid, or a solid state, can be measured by IR spectroscopy. IR light interacts with the chemical bonds in the substance-of-interest, either organic or inorganic material, and the bonds in such material will absorb varying intensities of IR light at varying frequencies. An IR spectrometer registers the IR light that is absorbed by a material and displays it in a form called an IR spectrum. Due to the non-invasive nature of the measurement, the IR absorption spectroscopy is a popular technology in many area of applications.

The absorbance bands, or "peaks" that occur at certain wavelengths or wavenumbers represent the absorbance of IR light at those wavelengths by molecules as a result of their chemical bonds. Each chemical bond in a molecule vibrates at a frequency which is characteristic of that bond. A group of atoms in a molecule (e.g. $CH_4$) may have multiple modes of oscillation caused by the stretching and bending motions of the group as a whole. If an oscillation leads to a change in dipole in the molecule, then it will emit or absorb a photon which has the same frequency.

To evaluate the presence and the concentration of molecules and substances present in a targeted object, IR light is passed through the sample. The intensity of the IR spectra that passes through the sample provides quantitative information (e.g. from the size of the absorption peaks), and the frequencies of the wavelengths at which absorption takes place in the targeted object, identifies the presence of certain molecules. Since no two compounds have the same atomic makeup, they produce different frequencies of vibrations between bonds of the atoms that make up the material. The IR spectroscopy thus provides a molecular "finger-print" of the substances present in a targeted object. Generally, for the purpose of quick identification, IR spectra data from known substances are generated, and libraries of calibration samples are used to identify unknown substances in the targeted object.

UV/VIS and IR spectroscopies can be combined with the imaging technology to extend the measurements to another dimension, i.e., the spatial information can be measured at the wavelength-range-of-interest. This emerging technology is often called either multispectral-imaging (MSI) or hyperspectral-imaging (HSI) technology to represent different level of spectral resolutions.

MSI and HSI technologies use a wavelength filter (such as Michelson or Offner interferometer as in the reference: F. Vagni, "*Survey of Hyperspectral and Multispectral Imaging Technologies*", RTO technical report, SET-065-P3, 2007) to filter out unwanted wavelengths leaving only a narrow band of wavelengths in the imaging process that provides signatural information correlating to the bonding configuration at atomic or molecular level in the targeted substances. Technically speaking, an MSI, or an HSI, system needs to sustain the imaging capabilities when the light is diffracted in the imaging process and that often increases the complexity and the fragility of the system. The present inventors have recognized that as a result, the prior art (current MSI and HSI systems) are often higher in size, weight, and power consumption (SWaP) and are often prohibitive especially for portable systems targeted for field applications.

The speed of prior art systems is another limitation. The three-dimensional data acquisition, storage, and processing require significantly higher storage space and computation power from the on-board computer.

The present inventors have recognized that the state-of-the-art systems available are often too slow for many demanding applications. The present inventors have recognized that one solution to increase the speed is to reduce the number of pixels in the imager so that the amount of data can be reduced. The present inventors have recognized that another solution is to reduce the number of wavelength bands in the measurement. However, the present inventors have recognized that both of these approaches reduce the sensitivity of the sensor and are often not acceptable for certain applications.

The present inventors have recognized the desirability of providing a chemical signature measurement by a high-speed spectrometer designed to be a small-size, lightweight, rugged, vibration- and shock-resistant apparatus. The present inventors have recognized the desirability of providing a chemical signature measurement by a high-speed spectrometer that has sensitivity in the wavelength range, but not limit to, from ultraviolet to longwave infrared.

SUMMARY OF THE INVENTION

An exemplary embodiment of the invention provides a multiband IR adjunct (MIRA) sensor to spectroscopically determine the content and the concentration of chemical composition of the targeted object.

The MIRA sensor includes a sensor housing, a first front optics from each of plural optical channel; a second front optics from each optical channel; a set of back optics from each optical channel; and a photo-detector (PD) from each optical channel that receives a polarized narrow-band light beam from the back optics and converts it into an electrical signal that is collected by a data acquisition unit.

According to one aspect, the sensor housing can enclose 2 to 10 optical channels of a spectrometer that work together to complete the spectroscopic scans in the process of data collection. According to one aspect, the sensor housing can provide a protective environment to prevent moisture condensation on the internal components. According to one aspect, the housing has a size of 5-10 inch long by 5-10 inch wide by 1-3 inch tall, weighs 1-10 pounds, and consumes 10-50 watts of power.

According to another aspect, the first front optics from each optical channel can have a first optical power that receives light signal with a field-of-regard from 10-90 degrees.

According to another aspect, the second front optics from each optical channel can have a second optical power that collimates the light received from the first front optics and reduces the divergence angle to 0-7 degrees.

According to another aspect, the set of back optics from each optical channel can comprise several lenses that focus the polarized narrow-band light beams received from the acousto-optic tunable filters (AOTF) device onto the PD.

According to another aspect, the PD from each optical channel is cooled by a thermoelectric cooler (TEC) operating at a temperature 30-120 degrees Celsius lower than room temperature which is required for high SNR of the measurement.

According to another aspect, the PD from each optical channel thermally contacts a common heat sink to dissipate the heat generated in the sensor operation to the outside environment.

According to another aspect, the PD from each optical channel provides electrical signals to the data acquisition unit via electrical feedthroughs that are electrically insulated from the common heat sink.

According to another aspect, the MIRA sensor includes an AOTF device from each optical channel that splits the light received from the second front optics into three beams, two polarized narrow band light beams and one broad-band beams.

According to another aspect, the data acquisition unit that enables to acquire data from multiple channels simultaneously which allows high speed spectroscopic measurements in a wide wavelength range to be executed.

According to another aspect, the MIRA sensor includes optical channels arranged in a linear array that covers a wavelength range from UV to long-wavelength infrared (LWIR).

According to another aspect, the MIRA sensor includes optical channels that scan in their wavelength range simultaneously in less than 1×10⁻³ second.

According to another aspect, the MIRA sensor has an array of optical channels arranged in a 2×2 format.

According to another aspect, the MIRA sensor has an array of optical channels arranged in a circular format.

According to another aspect, the dimension of the sensor housing can be larger or smaller, and the optics can be made from different material for higher transparency; According to another aspect, the MIRA sensor has optics with the diameter greater or less than 1 inch.

According to another aspect, the MIRA sensor has more than two front optics.

According to another aspect, the MIRA sensor includes an AOTF having the size from 1-5 cm in its largest dimension. According to another aspect, the material of the AOTF is TeO2 for the optical channel where the wavelength range is less than 4.5 micro meters. According to another aspect, the material of the AOTF is different from TeO2 for the optical channel where the wavelength range is greater than 4.5 micro meters.

An exemplary MIRA spectrometer works with the UV/VIS and/or IR imagers to address the shortcomings of the prior art. The MIRA sensor and a method for using the same which augment the sensing capability of the existing IR imagers can be used in many civilian and military applications.

In one aspect, the MIRA sensor device is a spectrometer sensitive to a wide range of wavelengths, from UV to LWIR, by integrating Si- and $Hg_{1-x}Cd_xTe$ (MCT)-PDs with AOTF.

In another aspect, the Si- and MCT-PDs are designed to have different cut-off wavelengths ($\lambda_c$) for different wavelength bands for the purpose of maximizing the quantum efficiency (QE) in their respective wavelength ranges. The fabrication processes for MCT PDs need to be modified accordingly to achieve different cut-off wavelengths.

In another aspect, the AOTF is a solid-state device based on the acoustic diffraction of light in an anisotropic medium. A periodic modulation of the index-of-refraction created by acoustic waves (AWs), which is generated by a radio frequency (RF) signal via a piezoelectric transducer bonded to a birefringent acoustic crystal, diffracts the incoming broadband light. For a fixed AW, only a limited band of optical frequencies satisfy the phase-matching condition to be cumulatively diffracted. As the frequency of RF signal is changed, the center wavelength of the optical passband is changed accordingly so that the phase-matching condition is maintained.

In another aspect, AOTFs can be designed in a non-collinear configuration, i.e. the AWs and optical waves propagate at different angles through the crystal to achieve high diffraction efficiency. FIG. 1 shows a schematic representation of a non-collinear $TeO_2$-based AOTF. The approximate tuning relation between the center frequency f of the AW and the passband center wavelength $\lambda_0$ is $$f = \frac{V_a \Delta n}{\lambda_0}\sqrt{\sin^4\theta_i + \sin^2 2\theta_i} \qquad \text{Equation 1}$$

where $\theta_i$ is defined as the angle between the optical axis and the incident light, $V_a$ is the acoustic velocity, and $\Delta n$ is the birefringence of the crystal.

In another aspect, the wavelength width, or the spectral resolution $\Delta\lambda$ of the passing band, often defined as the full width at half maximum (FWHM) of the emission or absorption peaks of the output spectrum, is inversely dependent of the size of the acousto-optic (AO) crystal L, given by $$\Delta\lambda = \frac{1.8\pi\lambda_0^2}{bL\sin^2\theta_i} \qquad \text{Equation 2}$$

-continued $$\Delta\lambda = \frac{1.8\pi\lambda_0^2}{bL\sin^2\theta_i}$$

Equation 2

Where b is the dispersion constant given by $$b = 2\pi\left(\Delta n - \lambda_0\frac{\partial\Delta n}{\partial\lambda_0}\right) \approx 2\pi\Delta n$$

Equation 3

A large-size AO crystal can be used for high spectral resolution. In the applications that use MSI and HSI systems, the size of the output light spot is also dependent of the size of AO crystal and the pertaining optics.

In another aspect, in a spectroscopic measurement, by changing the frequency range of the RF signal, the waveband-selection by AOTF-based spectrometer can be programmed as needed, and wavelength step size of the scan can also be programmed. The wavelength switching time of AOTF device is around $10^{-6}$ second, and, therefore, enables the design of high-speed spectrometers.

In another aspect, the AOTF is a solid-state device with no moving parts and is therefore insensitive to mechanical vibrations and shocks.

In another aspect, the change of operation temperature shifts the passing-band wavelength, the change can be corrected by adjusting the frequency of the RF signal accordingly based on the temperature-dependent calibration. Therefore, AOTF device can operate over extreme temperature ranges.

Additional information concerning AOTF can be found in the following publications, each of which is fully incorporated herein by reference: P. Kasili and T. Vo-Dinh, "Hyperspectral imaging system using acousto-optic tunable filter for flow cytometry applications", Cytometry Part A, 69A 835(2006); M. E. Martin, M. Wabuyele, and M. Panjehpour, "An AOTF-based dual-modality hyperspectral imaging system (DMHSI) capable of simultaneous fluorescence and reflectance imaging" Med. Eng. Phys., 28 149(2006); Q. Li, D. Xu, X. He, Y. Wang, Z. Chen, H. Liu, Q. Xu, and F. Guo, "AOTF based molecular hyperspectral imaging system and its applications on nerve morphometry" Appl. Opt., 52 3891(2013). In another aspect, the MIRA sensor device is a spectrometer that has a wide field of regard (90 degree) and therefore covers large area in the intelligence, surveillance, and reconnaissance operations. Also incorporated by reference are U.S. Pat. Nos. 5,599,717; 7,103,402; 6,965,431; and U.S. Pat. No. 5,216,484 to the extent these patents are not inconsistent with the present disclosure.

In another aspect, the MIRA sensor is sealed inside the sensor housing that is filled with inert gas, for example, $N_2$ or Ar, to prevent moisture from condensing on the optics, the AOTFs, and windows of the PDs, therefore, maximized optical throughput can be achieved.

In another aspect, each channel of the MIRA sensor is a spectrometer comprising the front optics, an AOTF device, the back optics, and a PD. The purposes of these components are to maximize the photon collection, to convert broadband photons into monochronic, narrow band photon signal, and to focus the monochronic narrow band photon signal onto the PD respectively.

In another aspect, the MIRA sensor is a spectrometer that is equipped with cooling capability for each PD. The cooling capability is provided by a TEC underneath each PD. The degree of cooling is increased for the optical channel with longer cut-off wavelength PDs, to minimize the noise level, or, to maximize the SNR, for each channel.

In another aspect, the MIRA sensor can be miniaturized to a small size, i.e., a low SWaP, that is advantageous in many applications that require portability of the sensor. This is attributed to the all solid-state components used in the sensor and small-size TEC involved in the sensor structure.

In another aspect, the MIRA sensor is a spectrometer that has high frame rate (up to 1000 Hz) manifested by scanning several wavelength bands simultaneously. This is required by some applications and is attributed to the high-speed wavelength switching of the AOTFs and the high-speed, up to 1 Giga samples/second, data acquisition hardware used in a control unit of the MIRA sensor.

In another aspect, the MIRA sensor, when integrated with UV, VIS, and IR imagers, reduces the size of the data file significantly but is still capable of identifying the content as well as estimating the concentration of the chemical constituents of the targeted object. The low SWaP of the MIRA sensor enables the wide deployment of the MIRA sensor either independently, or when combined with other imagers in their respective applications.

In another aspect, the multi-band infrared adjunct (MIRA) sensor is a miniaturized high-speed spectroscopy device that provides the spectroscopic information of the targeted chemical substances by analyzing the signature emission and/or absorption peaks. When combined with a visible and/or an infrared imager that provides spatial information, the MIRA sensor augments the capabilities of a sensing system in identifying the chemical composition, the characteristics of the target quickly with a high level of confidence which is essential for certain applications. The device described comprises of only solid-state components with no moving parts, which offers high shock resistance, low size, weight, and power consumption, and therefore high portability. The MIRA sensor can also be used by itself as a high-speed portable spectrometer that has wide civilian and military applications.

Numerous other advantages and features of the present invention will be become readily apparent from the following detailed description of the invention and the embodiments thereof, and from the accompanying drawings.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1:
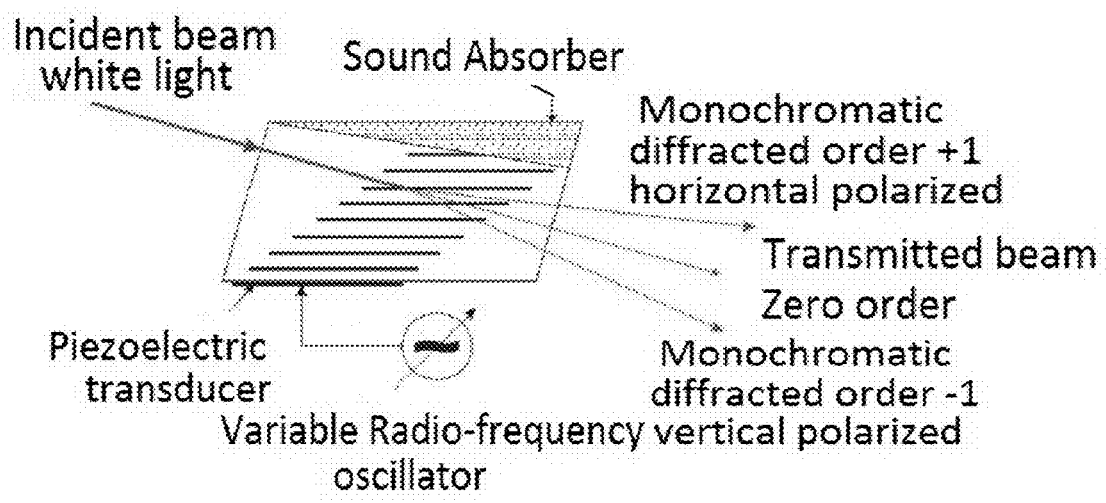
FIG. 1 is a schematic diagram of an operating principle of an AOTF device.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. Ser. No. 16/699,552, filed Nov. 29, 2019.

FIG. 1 illustrates the operating principle of an AOTF device. It consists of a piezoelectric transducer bonded to a birefringent crystal. When the transducer is excited by an applied RF signal, AWs are generated. The propagating AW produces a periodic modulation of the index of refraction. This provides a moving phase grating which, under proper conditions, will diffract portions of an incident light beam. For a fixed acoustic frequency, only a limited band of optical frequencies satisfy the phase-matching condition and be cumulatively diffracted. As the RF frequency is changed, the center wavelength of the optical passband is changed accordingly so that the phase matching condition is maintained. The diffracted light intensity is directed into two physically separated first order beams, denoted as the (+) and (−) beams. These beams are orthogonally polarized and separated when they exit from the crystal, and the angle of the deflected beam does not vary appreciably with changes in the optical wavelength.

Figure 2:
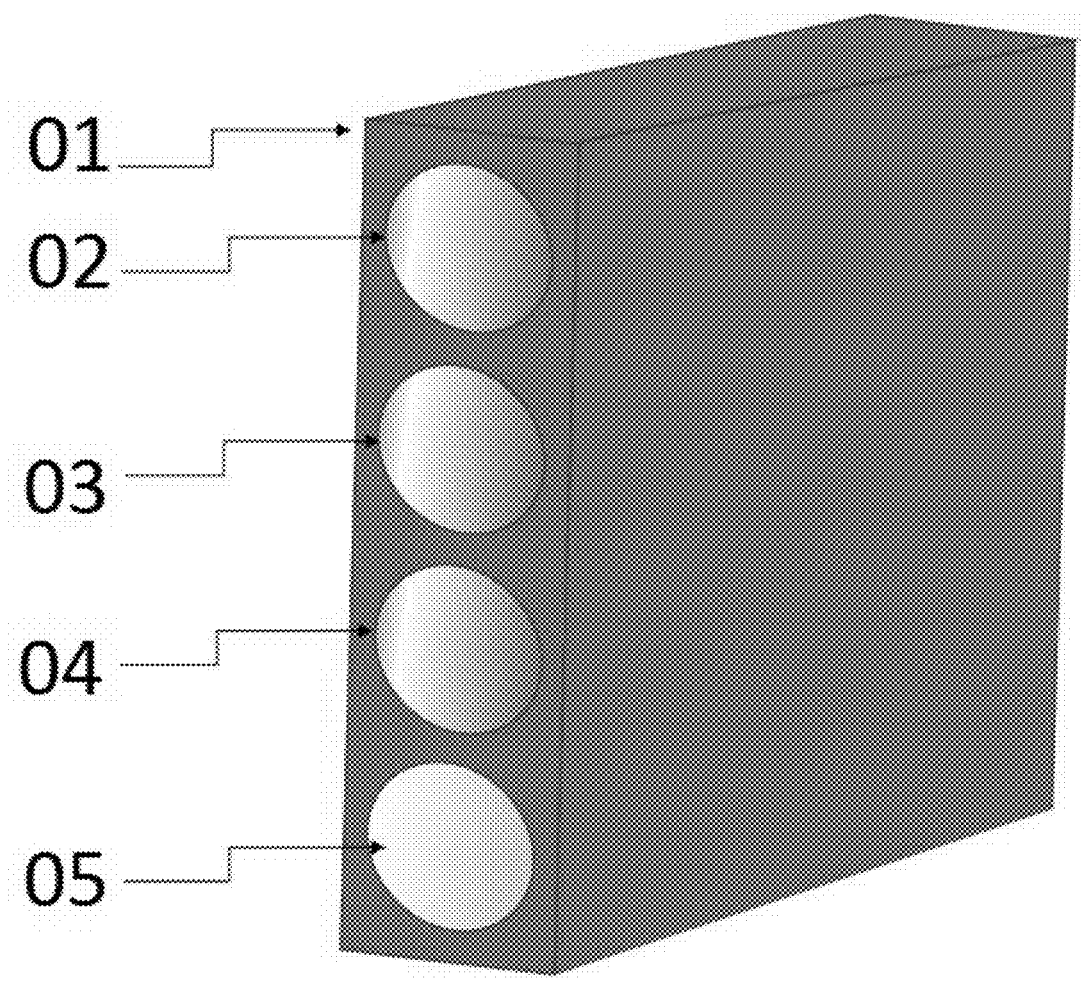
FIG. 2 is a schematic, perspective view of an exemplary MIRA sensor.

FIG. 2 illustrates an exemplary MIRA sensor for measuring the spectra of the object-of-interest in accordance with an embodiment of the present invention. In this embodiment, the MIRA sensor has four optical channels correspondent to UV/VIS/near infrared (NIR), short-wavelength infrared (SWIR), mid-wavelength infrared (MWIR), and LWIR wavelength ranges respectively.

Referring to FIG. 2, this is a perspective view of an exemplary MIRA sensor for measuring the spectra of the object-of-interest in accordance with an embodiment of the present invention. In this embodiment, the MIRA sensor has a housing 01 that has a size of 5 inch by 5 inch by 1.5 inch. It has four optical channels 02, 03, 04, and 05 having first front optics corresponding to UV/VIS/NIR (350 nm-1000 nm), SWIR (1.0 μm-2.5 μm), MWIR (2.5 μm-4.5 μm), and LWIR (4.5 μm-12 μm) wavelength ranges respectively. In this example, the optics for each channel are made of different optical materials based on the optical properties of these materials in their respective wavelength ranges. The examples of the optical properties of these materials are, but not limited to, transparency values and refractive indices. The exemplary materials for the optical channels 02, 03, 04, and 05 are, but not limited to, SF11 glass, N-BK7 glass, $CaF_2$, and ZnSe respectively. The size of each of the first front optics is 1-inch diameter to maximize the photon collection and lower the cost.

Figure 3:
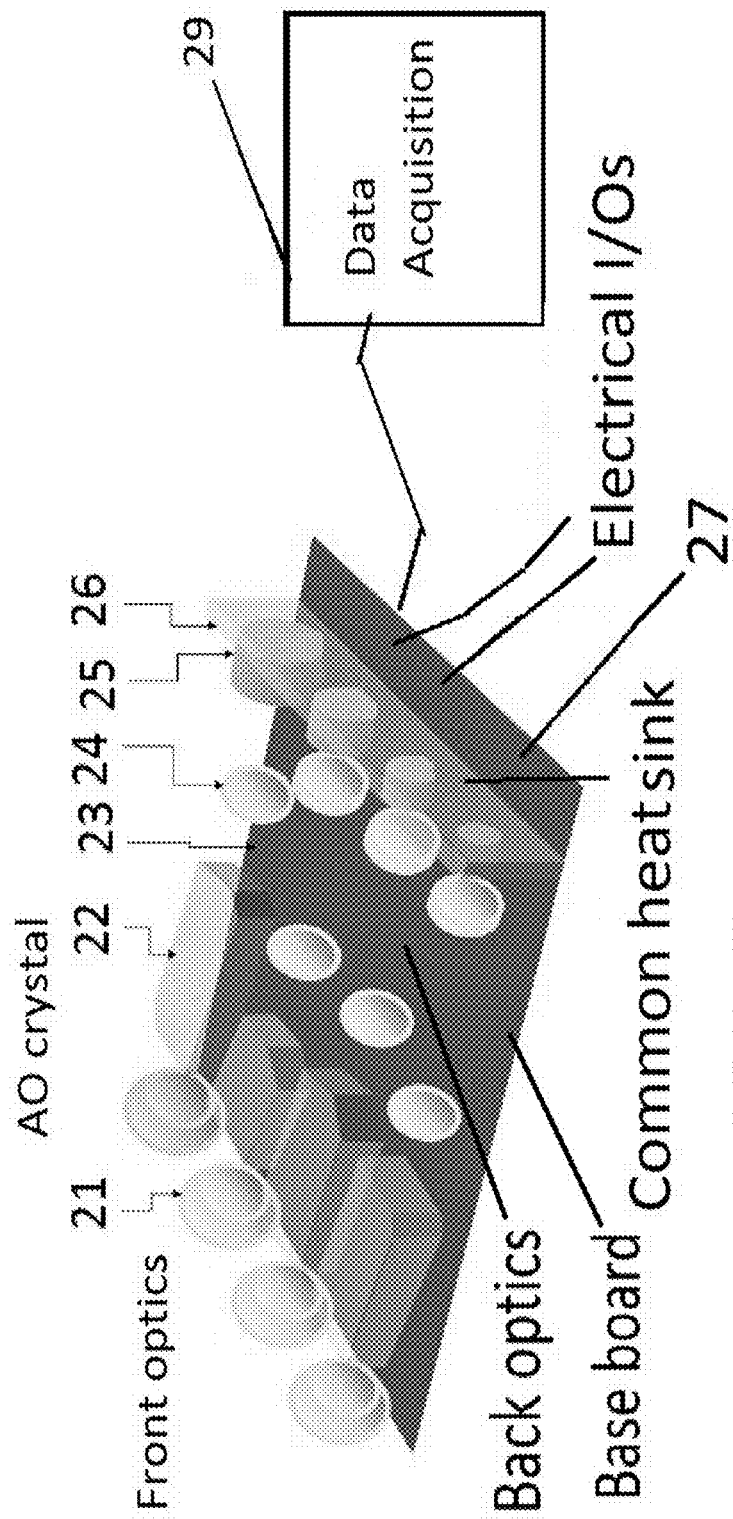
FIG. 3 is a schematic perspective view of an exemplary MIRA sensor.

Referring to FIG. 3, this is a perspective view of the internal structure of an exemplary MIRA sensor for measuring the spectra of the object-of-interest in accordance with an embodiment of the present invention. FIG. 3 illustrates the internal structure of an exemplary MIRA sensor for measuring the spectra of the object-of-interest in accordance with an embodiment of the present invention.

In this embodiment, the MIRA sensor has four optical channels each consists of the front optics 21, an AOTF device 22, the back optics 24, and a PD 25 respectively. The PDs are signal-connected to I/O circuits 27 that are signal connected to a data acquisition unit 29. The data acquisition unit can be hardware in a control unit. The result of the data collected can be the spectra of the object-of-interest. The four channels are mounted on a base board 23 to ensure the structural integrity and the optical alignment. The PDs 25 are mounted on a common heat sink 26 to release the heat to the outside media and to maintain the required operational temperature for the components.

It should be appreciated that for clarity, the description provided about the MIRA sensor in FIG. 3 omits certain details and components, such as the mounting structures and the method of installation of the mounting structures, which are techniques well known in the industry and are not necessary to explain and understand the present invention.

The sensor housing 01 shown in FIG. 2 includes the mechanism to seal against the base board 26; the front optics of the channels 02, 03, 04, and 05; and the heat sink 26. The sealing is designed to prevent the ambient moisture from entering the interior of the MIRA sensor so that the condensation of moisture is prevented and, therefore, the optical transparency of all pertaining components is maintained.

In this embodiment of the MIRA sensor, the AOTF devices such as 22 can have different sizes and shapes based on the design for each optical channel. The back optics 24 can have different designs for each channel depending on the wavelength range, the optical calculation, and the available space between the AOTF 22 and PD 25. The PD 25 for each channel can have different sizes depending on the required cooling power and, therefore, the TEC used for the channel.

Figure 4:
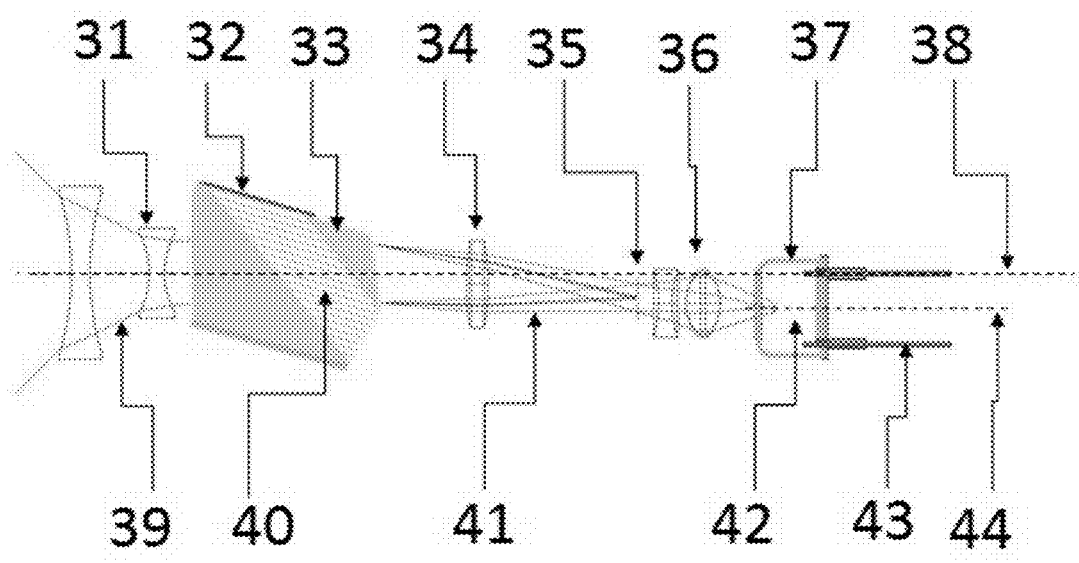
FIG. 4 is a schematic diagram of an exemplary optical channel of an exemplary MIRA sensor.

FIG. 4 illustrates an exemplary optical channel of an exemplary MIRA sensor for measuring the spectra of the object-of-interest in accordance with an embodiment of the present invention. In this embodiment, both orthogonally polarized beams are collected by back optics to increase the signal on the PD, in some applications the SNR is more important than the spectral resolution.

Referring to FIG. 4, this is an illustration of an exemplary optical channel of an exemplary MIRA sensor for measuring the spectra of the object-of-interest in accordance with an embodiment of the present invention. In this example, the photon signal 39 from the object-of-interest with 90 degree field-of-regard is collected by the first front optics of each channel 02, or 03, or 04, or 05, and the second front optics 31 of each channel; the photon signal from 90 degree field-of-regard is now collimated to less than 7 degree divergence before entering the AOTF device 33. Inside the AOTF device 33 the broad-band light beam is diffracted by the modulated index of diffraction of the crystal 40 that is generated by the RF signal via the transducer 32 that is attached to the AO crystal 33. The broad-band light beam is separated into three beams after diffracted inside the AO crystal 33, the narrow-band, polarized (+) beam on the top, the narrow-band, polarized (−) beam on the bottom, and the broad-band unpolarized beam in the middle. The polarized (+) and (−) beams are filtered narrow-band photon signals and are collected by the first back optics 34 and the second back optics 36, the broad-band unpolarized beam in the middle is the unfiltered photon signals and will be stopped by a stopper 35 before entering the back optics 36. It should be appreciated that for clarity the description provided about the MIRA sensor in FIG. 4 omits certain details and components, such as the electrical connection of the transducer 32 to the driving circuitry outside the sensor housing, which techniques are well known in the industry and are not necessary to explain and understand the present invention.

Referring to FIG. 4, as an example in accordance with an embodiment of the present invention, one transducer 32 is attached to the AO crystal. In other channels of this exemplary MIRA sensor in accordance with an embodiment of the present invention, two transducers are attached to the AO crystal. Each transducer is responsive to a range of wavelength so that the optical channel with two transducers attached to the AO crystal covers a wider wavelength range required by the specific application.

Referring to FIG. 4, as an example in accordance with an embodiment of the present invention, the first back optics 34 and the second back optics 36 are designed to collect both (+) and (−) beams for the purpose of increasing the strength of the signal. The first back optics 34 and the second back optics 36 can also be designed to collect only the (+) beam to achieve higher spectral resolution but to have lower signal strength, therefore, lower SNR.

Referring to FIG. 4, as an example in accordance with an embodiment of the present invention, the light beam exiting the AOTF 33 is deviated from the central direction of the incoming light beam 38, and therefore hit the PD 37 at a location 44 that is shifted from center line 38 of the incoming light beam. This shift requires the PD to be located at the correct position that maximizes the photon signal.

Referring to FIG. 4, as an example in accordance with an embodiment of the present invention, the output signal 42 from the PD 37 is collected by data acquisition unit via electrical feedthroughs 43. The electrical feedthroughs 43 pass through the common heat sink 26 and are electrically isolated with the common heat sink 26. The electrical feedthroughs 43 are also sealed with the common heat sink 26 to prevent the moisture in the ambient from entering the sensor housing. It should be appreciated that for clarity the description provided about the MIRA sensor in FIG. 4 omits certain details and components, such as the mounting structures and the method of installation of the mounting structures, and the connection method for the electrical feedthroughs to the outside data acquisition circuitry which techniques are well known in the industry and are not necessary to explain and understand the present invention.

In one embodiment the four optical channels can be arranged in a 2×2 format when designed as an independent spectrometer to minimize the SWaP.

In another embodiment the four optical channels can be arranged in any other format, such as a curved form, which is better integrated with different existing image sensors.

In another embodiment the spectrometer can have less than four channels or more than four channels depending on the required wavelength range, the spectral resolution, and the speed of the measurements.

In another embodiment the spectrometer can be used independently as a portable apparatus for other scientific and engineering applications.

In another embodiment the front optics can have different field-of-regard, or field-of-view, or more complex front optics for different applications.

In another embodiment, the spectrometer can be designed to be an HSI imager by replacing the PDs with image sensor for UV/VIS/NIR channel and focal plane arrays (FPAs) for IR channels. The front and back optics, therefore, can be redesigned to sustain the integrity of the image during the wavelength splitting process.

Although multiple embodiments of the present invention have been illustrated in the accompanying drawings and described in the Detailed Description, it should be understood that the invention is not limited to the disclosed embodiments, but is capable of numerous rearrangements, modifications and substitutions without departing from the invention as set forth and defined by the following claims. It should also be noted that any reference to the "present invention" or "invention" used herein relates to exemplary embodiments and not necessarily to every embodiment that is encompassed by the appended claims.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A multiband IR adjunct (MIRA) sensor to spectroscopically determine the content and the concentration of chemical composition of a targeted object, comprising:
    a sensor housing;
    a first optical channel carried by the housing;
    a first front optics in the first optical channel receiving a photon signal;
    a second front optics in the first optical channel receiving the photon signal from the first front optics;
    an acousto-optic tunable filter (AOTF), carried by the housing, receiving light beams from the second front optics;
    a photo detector (PD) carried by the housing;
    a set of back optics in the first optical channel that receives polarized narrow-band light beams from the AOTF and focuses the polarized narrow-band light beams onto the PD, the PD converting the polarized narrow-band light beams into an electrical signal;
    a data acquisition unit signal-connected to the PD, the data acquisition unit collecting the electrical signal.

2. The MIRA according to claim 1, further comprising a thermo-electric cooler (TEC), wherein the PD is cooled by the TEC operating at a temperature 30-120 degrees Celsius lower than a room temperature which is required for high SNR of the measurement.

3. The MIRA according to claim 1, further comprising a heat sink, wherein the PD thermally contacts the heat sink to dissipate the heat generated in sensor operation to the outside environment.

4. The MIRA according to claim 2, wherein the PD provides the electrical signals to the data acquisition unit via electrical feedthroughs that are electrically insulated from the heat sink.

5. The MIRA sensor according to claim 1, wherein the AOTF device splits the light received from the second front optics into three beams, two polarized narrow band light beams and one broad-band beam.

6. The MIRA sensor according to claim 1, wherein the sensor comprises multiple optical channels, configured the same as the first optical channel, and the control can acquire data from the multiple channels simultaneously, which allows high speed spectroscopic measurements in a wide wavelength range to be executed.

7. The MIRA sensor according to claim 6, wherein the multiple channels are arranged in a linear array that covers a wavelength range from UV to LWIR.

8. The MIRA sensor according to claim 6, wherein the multiple channels are arranged in a 2×2 format.

9. The MIRA sensor according to claim 6, wherein the multiple channels are arranged in a circular format.

10. The MIRA sensor of claim 1, wherein the material of the AOTF is TeO2 for the optical channel where the wavelength range is less than 4.5 micro meters.

11. The MIRA sensor of claim 10, wherein the material of the AOTF is different from TeO2 for the optical channel where the wavelength range is greater than 4.5 micro meters.

12. The MIRA sensor of claim 1, wherein the housing has the size of 5-10 inch long by 5-10 inch wide by 1-3 inch tall, weighs 1-10 pounds.

13. The MIRA sensor of claim 1, wherein the sensor consumes 10-50 watts of power.

14. The MIRA sensor of claim 1, wherein the sensor further comprises 1 to 9 additional optical channels of the spectrometer that work together to complete the spectroscopic scans in the process of data collection.

15. The MIRA sensor of claim 1, wherein the first front optics from the first optical channel have a first optical power that receives light signal with a field-of-regard from 10-90 degrees.

16. The MIRA sensor of claim 1, wherein the second front optics from the first optical channel has a second optical power that collimates the light received from the first front optics and reduces the divergence angle to 0-7 degrees.

17. The MIRA sensor of claim 1, wherein the back optics from the first optical channel is composes of several lenses that focuses the polarized narrow-band light beams received from the AOTF device onto the PD.

18. The MIRA sensor of claim 1, further comprising a second optical channel and a third optical channel, configured the same as the first optical channel; wherein the second and third optical channels are carried by the housing, and the data acquisition unit is signal-connected to the PDs of the second and third optical channels, the data acquisition unit collecting the electrical signals from the second and third optical channels.

19. The MIRA sensor according to claim 18, wherein first, second and third optical channels are arranged in a linear array that covers a wavelength range from UV to LWIR.

* * * * *